US005410599A

United States Patent [19]

Crowley et al.

[11] Patent Number: 5,410,599

[45] Date of Patent: Apr. 25, 1995

[54] VOICE AND DATA ENCRYPTION DEVICE

[75] Inventors: John J. Crowley, Rockville, Md.; Michael J. Wickham, Vienna, Va.

[73] Assignee: TECSEC, Incorporated, Vienna, Va.

[21] Appl. No.: 61,327

[22] Filed: May 14, 1993

Related U.S. Application Data

[63] Continuation-in-part of Ser. No. 883,731, May 15, 1992, abandoned.

[51] Int. Cl.[6] .................. H04L 9/00

[52] U.S. Cl. .................. 380/9; 380/49

[58] Field of Search .................. 380/9, 18, 21, 25, 49, 380/2

[56] References Cited

U.S. PATENT DOCUMENTS

| | | | |
|---|---|---|---|
| 2,898,402 | 8/1959 | Cory et al. | 380/2 |
| 2,951,120 | 8/1960 | Dingley, Jr. | 380/2 |
| 3,781,472 | 12/1973 | Goode et al. | 380/2 |
| 4,281,216 | 7/1981 | Hogg et al. | 380/9 |
| 4,368,357 | 1/1983 | Gurak | 380/2 |
| 4,691,355 | 9/1987 | Wirstrom et al. | 380/25 |
| 4,694,492 | 9/1987 | Wirstrom et al. | 380/25 |
| 4,802,220 | 1/1989 | Marker, Jr. | 380/49 |
| 4,811,392 | 3/1989 | Marzolini | 380/49 |
| 4,817,146 | 3/1989 | Szczutkowski et al. | 380/49 |
| 4,866,707 | 9/1989 | Marshall et al. | 380/25 |
| 4,893,339 | 1/1990 | Bright et al. | 380/21 |
| 4,897,875 | 1/1990 | Pollard et al. | 380/25 |
| 4,924,513 | 5/1990 | Herbison et al. | 380/25 |
| 4,965,804 | 11/1990 | Trbovich et al. | 380/21 |
| 5,007,084 | 4/1991 | Materna et al. | 380/18 |
| 5,163,088 | 11/1992 | Lo Cascio | 380/18 |
| 5,166,977 | 11/1992 | Ross | 380/18 |
| 5,222,136 | 6/1993 | Rasmussen et al. | 380/9 |
| 5,233,653 | 8/1993 | Katsurabayashi | 380/18 |

*Primary Examiner*—Salvatore Cangialosi
*Attorney, Agent, or Firm*—Jon L. Roberts; Thomas M. Champagne; Roberts & Associates

[57] ABSTRACT

A portable voice and data encryption device designed to be used with normal wideband telephone and cellular telephones, computers and facsimile machines to transmit voice and data in encrypted form. The V/DED comprises a voice and data encryption module, an encryption and control module, and a modem module. The modem module can adapt its data rate to account for the changes in the signal strength between the sending and receiving sites. The encryption and control module senses the change in data rate of the modem module during transmission and synchronizes the activities of the voice and data module so that the amount of data being produced for encryption and transmission matches the data rate being experienced by the modem module. The V/DED very simply connects to the wall jack of a normal PSTN with the computer, telephone, or facsimile machine plugging directly into the V/DED.

20 Claims, 3 Drawing Sheets

VOICE AND DATA ENCRYPTION DEVICE

This is a continuation-in-part of application Ser. No. 07/883,731, filed May 15, 1992, now abandoned.

BACKGROUND OF THE INVENTION

1. Field of the Invention

This invention relates generally to encryption devices and more specifically to a device for encrypting voice signals and data including facsimile transmission data between any telephone system and individual cellular telephones. The telephone system may be a public switched telephone.

2. Background

A communications security device that is economical, commercially available, easy to use and which maintains the privacy and security of both voice and data is critical to the maintenance of U.S. competitiveness in both local and global market-places. The information age has brought along with it the concept that information in the form of ideas, strategies, bids, and product specifications is a very valuable asset and worth considerable sums of money. The idea of industrial espionage, the attacking and exploiting of the information resources of others, is not new. In fact, in April, 1992 Robert Gates, Director of Central Intelligence, testified before Congress that both friend and foe alike were conducting industrial espionage in the United States. With the advent of the digital computer and its ability to store and process collected information, the need to maintain the security of these valuable assets has become all the more important . . . and difficult.

The most common transmission means for information between human beings in the information age is still analog voice through common telephony means. The common telephony means now predominently used by the corporate executive is analog cellular telephones communicating over public switched telephone equipment. For purposes of simplicity, public switched telephones shall be used to refer to both analog and digital telephone systems. The need for secure point to point communications with a caller identification and compartmentalization scheme is apparent considering the interests of corporate privacy and security.

The present invention, a Voice and Data Encryption Device (V/DED) is a security module designed specifically for use with analog cellular and public switched telephone systems as well as with other equipment such as computers and facsimile machines. The V/DED provides telephone users with the capability to enhance the privacy and security of their voice and data transmission in an effective fashion and at a reasonable price. A software implemented security key provides protection from compromise for the information life of most commercial information. The V/DED operates in three different modes: nonsecure, plain text mode, privacy (i.e. universal table) mode, and keyed privacy (i.e. private tables used within a given organization) modes. The information security model developed around the V/DED utilizes a standard encryption technique such as the Data Encryption Standard described in Federal Information Processing Standard Pub. No. 46, 1/77 issued by the National Institute of Science and Technology, Department of Commerce, which is incorporated herein by reference in order to reach the broadest base of information systems. Thus government and commercial firms can utilize dual role (encrypted and non-encrypted) secure cellular, public switched telephone, and data communication capability in a cost effective manner.

SUMMARY OF THE INVENTION

It is therefore an objective of the present invention to use analog cellular and all modes of public switched network terminal communication and switching equipment to provide encrypted voice and data communications between communicating parties.

It is a further objective of the present invention to provide a voice and data encryption system that conforms with Department of Commerce standards for commercial, domestic and international markets.

It is a further objective of the present invention to provide a miniaturized, low power, affordable encryption unit for commercial and governmental use.

In addition, it is an objective of the present invention to provide an encryption unit that is modular in nature and is adapted to be connected to both cellular and public switched terminal communication equipment.

It is a further objective of the present invention to support encryption of digital RS232 data, that is, facsimile transmissions and computer to computer communications.

It is a further objective of the present invention to support near real time encryption and decryption of voice and data transmissions.

It is a further objective of the present invention to reproduce recognizable good quality voice transmission at lower data rates.

The V/DED is fundamentally a digital encryption system that takes the analog voice signal or any digital signal from a telephone and processes the signal digitally, encrypts the digital signal and converts it back to an analog signal to be transmitted securely to another point, where it is converted from analog to digital, decrypted, and converted back into a analog voice signal. The same process is followed for digital voice, facsimile and data transmissions.

The first step in this process is to digitize the analog voice signal. This digitized signal is then compressed to minimize the amount of data that is transmitted, thus speeding the transmission of the data.

For purposes of simplicity the term "data" shall be used to refer to 1) voice signals that are digitized, and/or compressed, 2) facsimile transmission of documents, and 3) any alpha numeric and/or binary data that is sent between computers.

The data is then fed into an encryption engine that has the appropriate encryption/decryption capability, and key management software, or firmware.

The encrypted data is then sent to a modem module which utilizes a known, available high forward error correction protocol. An example of such a protocol is the MNP (Microcom Networking Protocol) class 10 protocol, which is embodied in Rockwell International's RC96V24 data/fax/voice modem chip set, the technical characteristics of which are incorporated herein by reference. Such a degraded communication path may be encountered when a vehicle using cellular communications travels a variable path along the coverage of a typical analog cellular site. In such a case, signal strength will vary due to different signal paths within a cellular coverage area. The signal may fade or be constrained by the urban landscape and may receive echoes from various paths. The high level protocol for degraded communication media built into the modem module of the V/DED can detect and correct errors in order to maximize accuracy of data transmitted and can change packet size and data rate to maximize efficiency of the V/DED send and receive process.

The V/DED comprises the following three modules:

a) Voice/Data Module, b) Encryption and control module c) Modem Module.

The Voice/Data module takes the analog voice signal from a telephone terminal and digitizes it via known analog to digital signal conversion techniques dependent upon communications throughput speed capability. The voice/data module also provides compression of the voice signal to minimize the data transfer requirement of the system thus allowing faster communication. The normal public switched network data rate is too high for analog cellular data rates. In contrast a degraded cellular link at this technological juncture may have a data rate from between 30° and 960° band. To maximize the throughput of data over a degraded cellular link, a minimum data rate from the V/DED is required. The voice module is engineered to be adaptive to varying data rates of cellular or other types of communications, thereby optimizing the data rate for voice transmission.

Because of the variable nature of the encrypted data transmission the data and voice reconstruction of a receiving location therefore must take place at a varying rates as well, (i.e., near real time).

The Encryption module (EM) provides all control to the other modules and provides a platform for a commercial encryption algorithm in hardware, software or firmware.

This EM has several interface embodiments: 1) a communications bus between modules that is based on the draft IEEE extension to the IEEE-p 996 draft specification entitled "PC/104-A compact Embedded-PC Standard" for the 104 pin personal computer bus, which is incorporated herein by reference; 2) a communications bus between modules that is based on Director Memory Access (DAM) data exchange devices of 8-bit multiples widths; and 3) a communications bus between modules that is based on an RS 232 serial interface.

The encryption module also provides the interface and protection for the cryptographic key management, that is, the exchange of key information as necessary. Any combination of the interface embodiments can be used in a particular implementation.

The EM also provides an optional RS232 interface for the digital data from either facsimile or computer transmission of data. The EM has the capability for full "duplex" or async/sync operation that is, encryption and decryption of the data for both sending and receiving from a given location.

The inherent internal checks for the proper functioning of the cryptographic controller and any setup and resychronization of the cryptography in the event of a controlled reset are all functions of the EM. The minimum power downstate of all the modules is controlled by the EM thereby preserving battery life.

Each module of the V/DED contains a low power mode and will be set into that mode by the EM in a controlled manner. This function minimizes the power loss in the standby mode when no communication is being processed.

The Modem Module (MM) provides various high speed data rates with error free digital data over degraded and distorted signal paths.

The side of the common bus of the V/DED structure provides a common path for the power, DMA interface control, memory, address and Input\output connections. The common bus structure and miniature connectors provide a stable connection platform for small scale (e.g., four inch by four inch surface mount) circuit boards. The DMA and/or interface bus also allows the future development of any digital platforms using the V/DED Type encryption module in their applications by simply writing in a specific manner to the EM using the bus interface.

DETAILED DESCRIPTION OF THE PREFERRED EMBODIMENT

The V/DED is designed to be a small portable device that can be used with a variety of equipment to send and receive encrypted data over normal telephone lines through a private switched telephone network (PSTN), a cellular telephone application, or a local area network.

Figure 1:
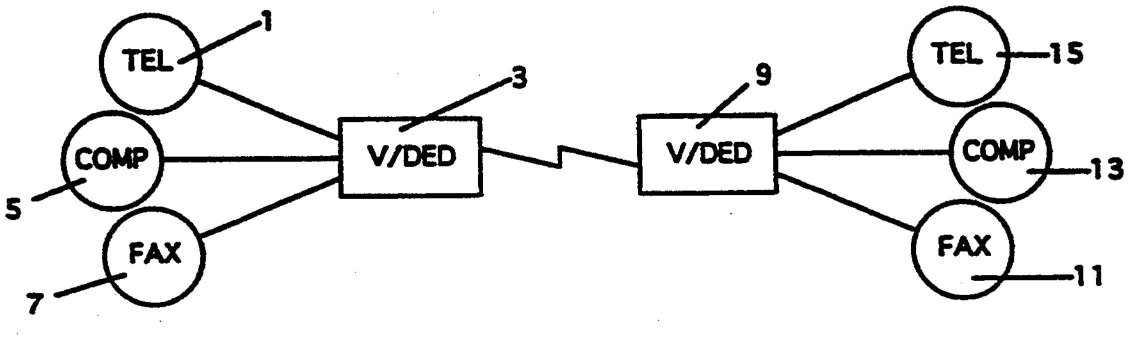
FIG. 1 General use of the voice and data encryption device.

Referring to FIG. 1, a general block diagram of the V/DED environment is shown. Unmodified telephone communication equipment [1] is of the normal wideband type usable over a PSTN or alternatively can be a cellular telephone equipment. The V/DED [3,9] is placed between the telephone communication equipment and the outgoing line and is adapted to receive a RJ 11 plug from the telephone communication equipment that would normally be plugged into a wall or a transceiver. A V/DED is connected in this manner on each end of the communication path. Additionally, a computer [5] having an RS 232 plug can be plugged into the V/DED which in adapted to be RS232 plug compatible in order to transmit computer data. Further, facsimile machines [7] can also send their output through the V/DED when connected through any compatible data source port such as an RJ 11 plug connector, DMA, or serial interfaces for subsequent transmission over the PSTN. When the V/DED is not operating in the secure mode all signals are passed directly through the V/DED to the PSTN without modification or processing.

Once the data is encrypted and transmitted by the sending or transmitting V/DED [3] it goes over the normal PSTN to a receiving V/DED [9] at a destination location. The encrypted data is then converted to digital data, decrypted, and converted to analog data whereupon it can be heard by user over normal wideband telephone or cellular telephone equipment [15]. Alternatively, computer data can be output from the RS 232 connector on the V/DED to a destination computer [13] in a similar manner. If such data is a facsimile transmission, the decrypted facsimile transmission can be transmitted to a destination facsimile device [11].

Figure 2:
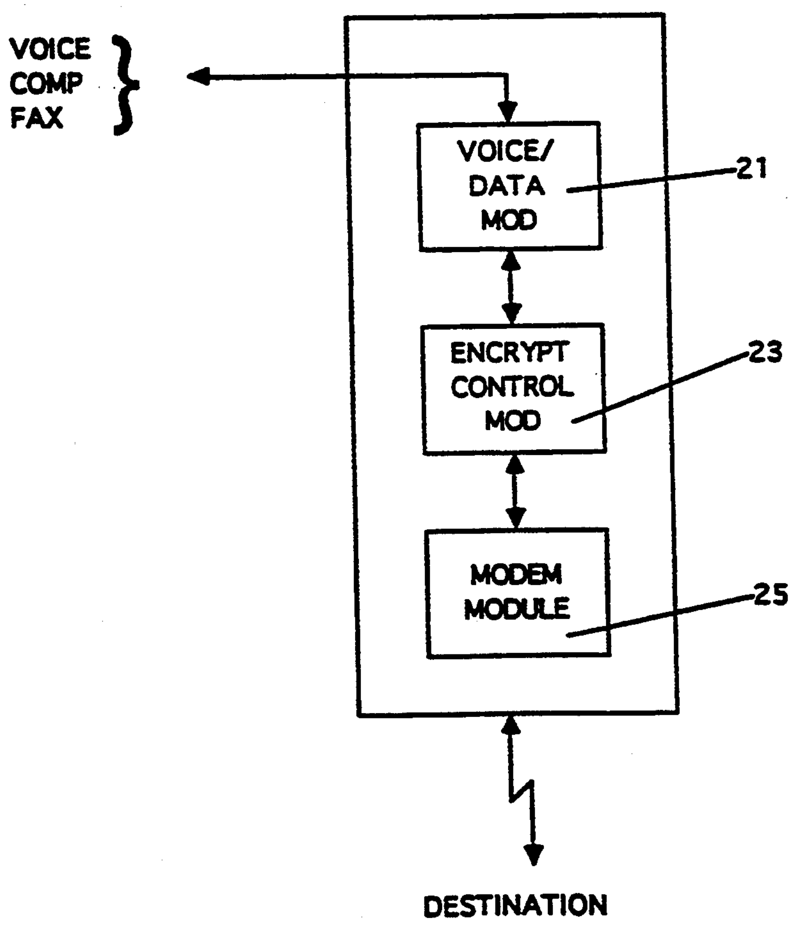
FIG. 2 Modular construction of the voice and data encryption device

Referring to FIG. 2, the V/DED is described in modular form. The V/DED comprises a voice/data processing module which filters and prepares out-going signals for encryption. The voice/data module [21] also takes analog data and sends it to the appropriate telecommunication equipment, computer, or facsimile device. Data from the voice/data module [21] is then sent to the encryption and control module [23]. This module encrypts or decrypts data and controls the overall input-output functioning of the V/DED using a public or proprietary polling technique. Encryption can be accomplished in a number of ways. One embodiment of the present invention encrypts data via the Consultative Committee for International Telegraph and Telephone (CCITT) standard V.42 bi-synchronous protocol, which is a standard for data encryption and which is incorporated herein by reference.

Voice analog compression is accomplished using one or more coding algorithms, including the Codebook Excited Linear Predictive (CELP) coding algorithm, which is also a Federal standard publication (FED-STD-1016) and which is incorporated herein by reference. Once data is encrypted, it is sent to the modem module [25] for subsequent transmission over a PSTN or other communications medium such as a LAN backbone.

Figure 3:
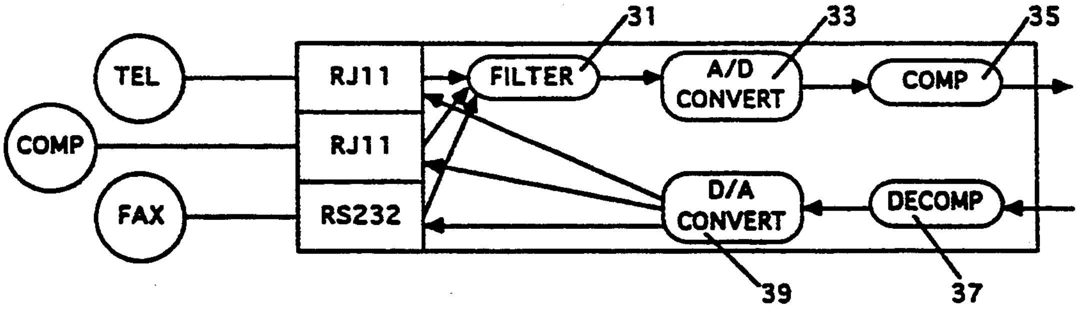
FIG. 3 Data flow through the voice module of the V/DED

Referring to FIG. 3, the voice and data module is described. Signals from normal telephone compatible LN or cellular telephone equipment is passed to the V/DED and enters the voice/data module. It is initially filtered [31] to increase the signal to noise ratio. The data is then converted from analog to digital data [33] and compressed [35] for subsequent encryption operations. Note that computer or other digitized data does not go through the compression algorithm as this is an unnecessary procedure. The input-output manager function of the EM controls the flow of input and output data to the correct port. Voice or data that is being received by the V/DED also passes through the voice module after decryption where it is decompressed [37] and converted from digital to analog data [39] so that it can be presented to the telephone communication equipment and subsequently heard over the telephone handset.

Figure 4:
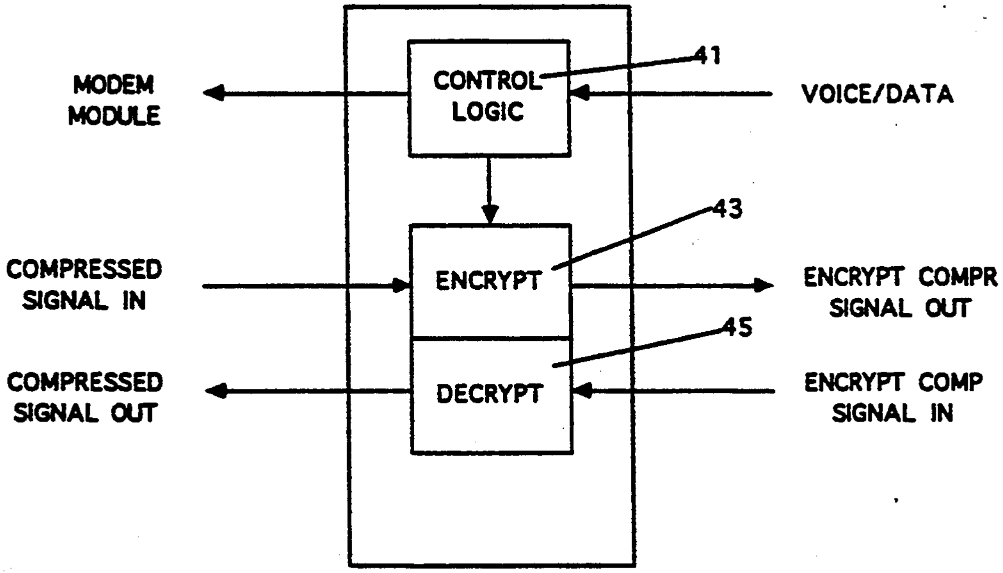
FIG. 4 Data flow through the encryption/decryption module of the V/DED

Referring to FIG. 4 the encryption and control module is shown. Outgoing digital data is presented to the encryption module to be encrypted by the hardware, software and/or firmware of the encryption module [43]. Encrypted data is thereafter sent to the modem module for subsequent transmission over the PSTN. At other times incoming data that is already in encrypted form is received by the encryption module where it is decrypted [45] and sent to the voice/data module for subsequent decompression and other operations.

The modem module functions as the gateway to send and receive data from the PSTN to the other modules of the V/DED. It further comprises the MNP-10 protocol for degraded signals in order to be useful in cellular communication as discussed (above). As the modem module adapts its transmission/reception data rate to account for a degraded signal environment, the encryption and control module senses the change in data rate and sends control signals [41] to the voice/data module to synchronize its activities with those of the modem module. In this way the voice/data module will not be creating more signals than the modem module is capable of sending.

Figure 5:
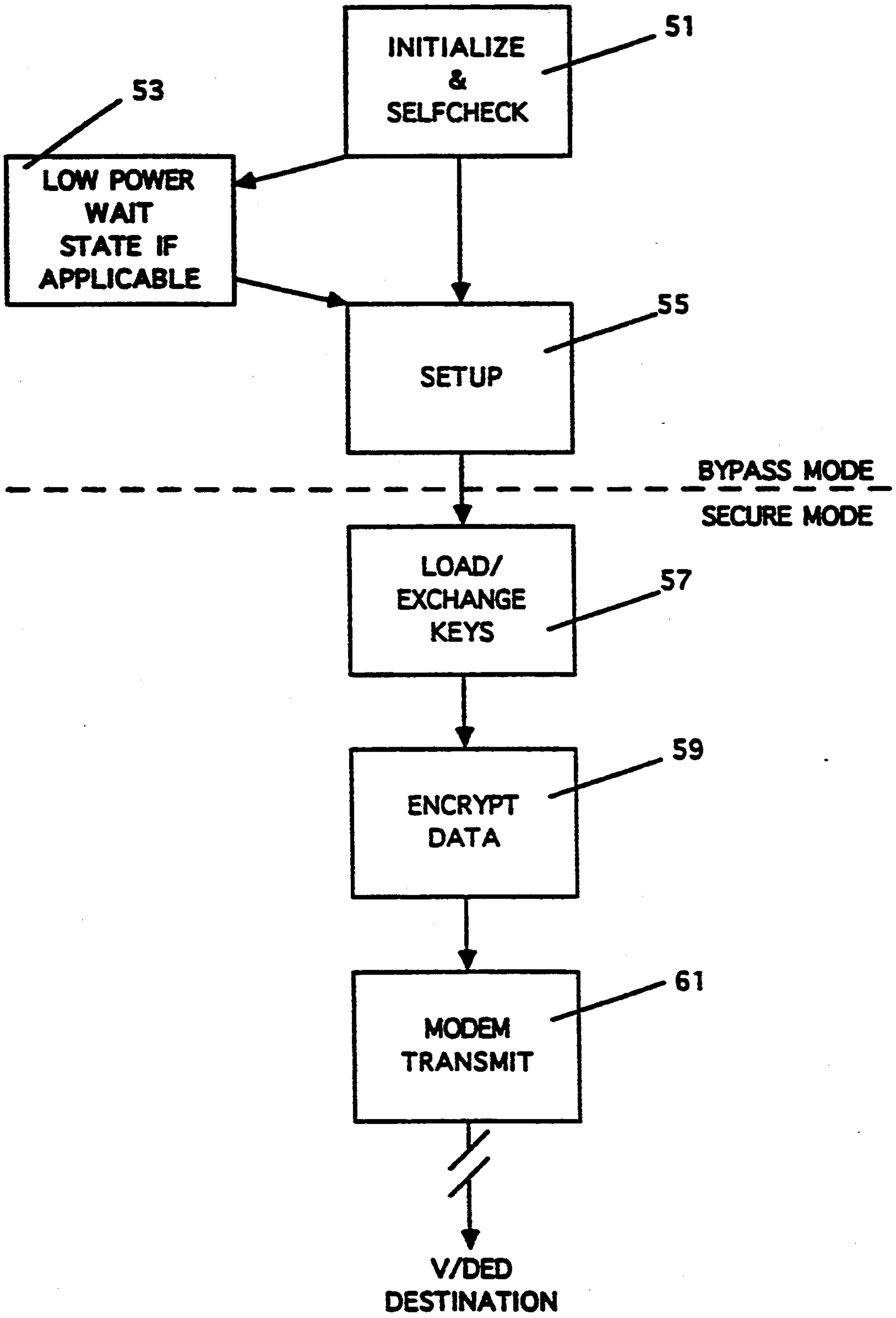
FIG. 5 Operation of the V/DED

Referring to FIG. 5, the operation of the V/DED is described. When power is first applied to the V/DED, an initialization and self check is performed [51] to insure all components of the V/DED are operating correctly. Thereafter, if the V/DED is not put into the secure mode after a period of time the V/DED will go into a low power wait state [53] until such time as the user desires to send encrypted information. When the user decides to send encrypted information, the user initiates a set up of the V/DED [55] and appropriate encryption keys are loaded [57]. Thereafter data is encrypted [59] and sent to the modem [61] where it is transmitted to a destination. It should be noted that until the set up for encrypted mode of operation is executed the V/DED is in a by-pass mode and all signals are sent directly over the PSTN from the telephone and computer equipment without being encrypted. However, once the V/DED is in a secure mode, all signals go through the data encryption and other routines described above.

How to Use

When power is first applied to the V/DED, or when the V/DED is reset, the various logic means of the V/DED are initialized and the normal types of internal self checks are made.

In the event that secure transmission is not yet desired and the telephone or other equipment is in an on-hook position, the V/DED, through its own internal power management, powers down to a low power or "wait" state until it is either shut off or activated by an "off-hook" condition.

It is important to note that until such time as a user desires secure communications, the V/DED is in a "by-pass" mode, that is, analog or digital signals go directly to the PSTN or are transmitted over a cellular network without being processed by the V/DED.

Once a user decides to engage the secure communications, however, the security setup is invoked and keys for encryption are loaded in the encryption engine. This key load procedure may be implemented in a number of ways. For example, the keys may be prepositioned, that is each party knows what the appropriate key for a given day is and merely enters that key in the V/DED. Thereafter transmissions are encrypted and decrypted at the destination according to the key entered.

Alternatively, keys may be pre-loaded in an EPROM or other means of electronic storage so that users need not enter any key data. Each V/DED will send and receive encrypted data in accordance with the stored key.

Another method may involve a master/slave relationship, where a key to be used by the sending party is transmitted to the receiving party V/DED which in turn decrypts data/voice according to the key transmitted.

Yet another example method is a split key concept where one-half of an encryption key is possessed by the sending V/DED and one-half by the receiving V/DED. In the establishment of communications the half-keys are exchanged, thereby having full identical keys at both the send and receive locations. Thereafter, communications are sent and received in encrypted form according to the full key possessed by each V/DED.

In this fashion, a user can take the V/DED (a small portable device) to any location where there is a telephone, computer, or facsimile machine. The user simply takes the V/DED and plugs it into the telephone system between the telephone, computer, or facsimile machine and the wall phone jack. Thereafter, once appropriate key information is entered, a user simply uses the telephone, facsimile machine or computer in a normal fashion. The V/DED processes all signals through its interface filters, converts, compresses, and encrypts the data and transmits it over the PSTN to a receiving location, where in a reverse process, that signal is received, decompressed, decrypted, and converted to an analog signal for play back over telephone communication equipment, computers or facsimile machines.

We claim:

1. A portable voice and data encryption device, comprising:

A) input means for accepting input signals from and providing received signals to communications equipment;

B) voice/data processing means, connected to the input means, for digitizing voice input signals and for compressing digitized voice input signals and digital input signals to provide compressed digital data, and further for decompressing received compressed data and for recovering analog signals, providing the received signals for the communications equipment;

C) encryption/decryption and control means, connected to the voice/data processing means, for encrypting the compressed digital data to provide output data and for decrypting received encrypted digital data, providing the received compressed data, and further for providing control signals to the voice/data processing means;

D) modem means, connected to the encryption/decryption and control means, for preparing the output data for transmission and for accepting the received encrypted digital data; and E) output means, connected to the modem means, for receiving the received encrypted digital data from and transmitting the output data to a telephony network.

2. The portable voice and data encryption device of claim 1, wherein the telephony network is a public/private switched telephone network.

3. The portable voice and data encryption device of claim 1, wherein the telephony network is a cellular telephone network.

4. The portable voice and data encryption device of claim 1, wherein the telephony network is a local area network.

5. The portable voice and data encryption device of claim 1, wherein said voice/data processing means comprises a filter means for filtering the input signals to increase a ratio of signal to noise of the input signals.

6. The portable voice and data encryption device of claim 5, wherein the encryption/decryption and control means comprises a software implemented data encryption algorithm and software implemented decryption algorithm.

7. The portable voice and data encryption device of claim 6 wherein said modem means comprises a stored communication protocol for controlling data communication over private switched telephone networks, cellular communications networks, and local area networks.

8. The portable voice and data encryption device of claim 1 wherein said communications equipment is telephone communications equipment selected from the group consisting of cellular telephone equipment and wideband telephone equipment connected to a PSTN.

9. The portable voice and data encryption device of claim 5 wherein said encryption/decryption and control means comprises a firmware implemented data encryption algorithm.

10. The portable voice and data encryption device of claim 1 wherein said communications equipment is selected from the group of equipment consisting of unmodified telephone equipment, computers, and facsimile machines.

11. A portable voice and data encryption device, comprising:

A) input means comprising means for accepting analog voice input signals from unmodified telephone equipment;

B) a voice/data processing module, connected to the input means, the voice/data processing module comprising:

1) filter means for filtering the input signals to increase a ratio of signal to noise of the input signals;

2) first conversion means for converting the analog input signals to digitized signals; and 3) compression means for compressing the digitized signals;

C) an encryption/decryption and control module, connected to the voice/data processing module, the encryption/decryption and control module comprising:

1) means for accepting the compressed digitized signals from the voice/data processing module;

2) encryption means for encrypting the compressed digitized signals to provide output data; and 3) control means for providing control signals for controlling operation of the voice/data processing module and the encryption means;

D) a modem module, connected to the encryption/-decryption and control module, for preparing the output data for transmission under direction of the control signals; and E) output means connected to the modem module, comprising means for transmitting the output data to a telephony network.

12. The portable voice and data encryption device of claim 11, wherein:

A) the input means further comprises means for accepting digital input data from communications equipment; and B) the encryption/decryption and control module further comprises means for accepting filtered digital input data and means for encrypting the filtered digital input data;

C) the output data comprising the encrypted digital input data and the compressed digitized signals.

13. The portable voice and data encryption device of claim 12, wherein:

A) the output means further comprises means for receiving encrypted data from a telephony network;

B) the modem module further comprises means for preparing the encrypted data for processing;

C) the encryption/decryption and control module further comprises:

1) means for accepting the encrypted data from the modem module; and 2) decryption means for decrypting the encrypted data to provide decrypted data;

D) the voice/data processing module further comprises:

2) decompression means for decompressing the decrypted data; and 3) second conversion means for converting the decrypted data to analog signals to provide received data; and E) the input means further comprises means for accepting the received data from the voice/data processing module and for providing the received data to the unmodified telephone equipment and the communications equipment.

14. The portable voice and data encryption device of claim 12, wherein the encryption/decryption and control module further comprises a software implemented encryption algorithm.

15. The portable voice and data encryption device of claim 12, wherein the encryption/decryption and control module further comprises a firmware implemented encryption algorithm.

16. The portable voice and data encryption device of claim 12, wherein the modem module comprises a stored communications protocol for controlling data communication over private switched telephone networks, cellular communications networks, and local area networks.

17. A method of providing secure communications, comprising the steps of:

A) accepting analog voice signals and digital data from communications equipment;

B) filtering the analog voice signals and digital data to increase the signal to noise ratio of the analog voice signals and digital data;

C) digitizing the analog voice signals to provide a digitized signal;

D) compressing the digitized signal and compressing any uncompressed digital data to provide a compressed digital signal;

E) encrypting the compressed digital signal to provide an encrypted output signal;

F) modulating the encrypted output signal for transmission over a telephony network; and G) transmitting the encrypted output signal over the telephony network.

18. The method of claim 17, further including the steps of:

A) receiving an encrypted input signal over a telephony network;

B) demodulating the encrypted input signal;

C) decrypting the demodulated encrypted input signal to provide a decrypted input signal;

D) decompressing the decrypted input signal;

E) recovering an analog voice component of the decrypted input signal to provide an analog voice input signal and digital input data; and F) providing the analog voice input signal and digital input data to communications equipment.

19. The method of claim 17, wherein the step of accepting analog voice signals and digital data from communications equipment includes the steps of accepting analog voice signals from unmodified telephone equipment and accepting digital data from a computer and a facsimile device.

20. The method of claim 18, wherein the step of providing the analog voice input signal and digital input data to communications equipment includes the steps of providing the analog voice input signal to unmodified telephone equipment and providing digital input data to a computer and a facsimile device.

* * * * *